United States Patent
Donlin

(10) Patent No.: US 10,235,233 B2
(45) Date of Patent: Mar. 19, 2019

(54) STORAGE ERROR TYPE DETERMINATION

(71) Applicant: HEWLETT PACKARD ENTERPRISE DEVELOPMENT LP, Houston, TX (US)

(72) Inventor: Pat Donlin, Deephaven, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 86 days.

(21) Appl. No.: 15/336,628

(22) Filed: Oct. 27, 2016

(65) Prior Publication Data

US 2017/0123879 A1    May 4, 2017

Related U.S. Application Data

(60) Provisional application No. 62/250,275, filed on Nov. 3, 2015.

(51) Int. Cl.
 *G06F 11/07*   (2006.01)

(52) U.S. Cl.
 CPC ........ *G06F 11/079* (2013.01); *G06F 11/0727* (2013.01); *G06F 11/0754* (2013.01); *G06F 11/0787* (2013.01); *G06F 11/0793* (2013.01)

(58) Field of Classification Search
 CPC .............. G06F 11/079; G06F 11/0769; G06F 11/0775; G06F 11/0787; G06F 11/0793; G06F 11/1048; G06F 11/1044; G06F 11/3692; G06F 11/3664
 See application file for complete search history.

(56) References Cited

U.S. PATENT DOCUMENTS

| | | | | |
|---|---|---|---|---|
| 7,565,581 | B1 * | 7/2009 | Halligan | G06F 11/0727 714/51 |
| 8,205,146 | B2 * | 6/2012 | Brueggen | G06F 11/1024 714/723 |
| 9,323,600 | B2 * | 4/2016 | Sivaramakrishnan | G06F 11/1666 |
| 9,329,932 | B2 * | 5/2016 | Weilemann, II | G06F 11/1008 |
| 2007/0033488 | A1 * | 2/2007 | Brueggen | G06F 11/1024 714/763 |
| 2007/0089035 | A1 * | 4/2007 | Alexander | G06F 11/1008 714/766 |
| 2014/0380130 | A1 | 12/2014 | Thatcher et al. | |
| 2015/0186230 | A1 | 7/2015 | Ackaret et al. | |

FOREIGN PATENT DOCUMENTS

WO    WO 2017/079454    5/2017

OTHER PUBLICATIONS

SGI-450PCT Application No. PCT/US2016/060358 International Search Report and Written Opinion dated Feb. 3, 2016.

* cited by examiner

*Primary Examiner* — Nadeem Iqbal
(74) *Attorney, Agent, or Firm* — Michael A. Dryja

(57) ABSTRACT

The present disclosure relates to an apparatus and a method for collecting failure/error history lists to identify and categorize erring memory locations in randomly accessible memory of a computer system. Method and apparatus consistent with the present disclosure may identify whether particular memory cells, rows of memory cells, or columns of memory cells within a memory device are associated with transient or persistent errors. These methods and apparatus may also avoid using portions of memory that have been associated with persistent errors or failures.

20 Claims, 7 Drawing Sheets

STORAGE ERROR TYPE DETERMINATION

CROSS REFERENCE TO RELATED APPLICATIONS

This application claims the priority benefit of U.S. provisional patent application No. 62/250,275 filed Nov. 3, 2015 the disclosure of which is incorporated herein by reference. U.S. Pat. No. 7,478,285 issued Jan. 13, 2009, is also incorporated herein by reference.

BACKGROUND OF THE INVENTION

Field of the Invention

The present invention is generally directed to collecting information relating to errors encountered when reading data from memory. More specifically, the present invention collects information that may be used to improve the operation of memory in computers.

Description of the Related Art

The advent of double data rate fourth generation (DDR4) memory technology, a follow-on to the DDR3 technology, brings increased memory capacity and memory speed, while also lowering the operating voltage and most importantly shrinking the integrated circuit die size. The result of the pressures to operate circuits with such demanding circumstances has resulted in a notable increase in memory errors for memory intensive workloads. While most frequently these errors are correctable, they may be temporary (transient) or persistent errors. The current practice for managing a large installed base of dual in-line memory modules (DIMMs), which can reach into the many thousands in some data centers, is to analyze the details of corrected memory errors. Although sophisticated techniques are employed to determine if a dynamic random-access memory (DRAM) within a DIMM is experiencing a significant failure mode, the high incidence of transient failures (memory errors which are spurious, somewhat random, and not specifically repeatable) results in a large number of predictive failure events, which in turn results in a large number of DIMM replacements. In many instances, however, erring memories do not exhibit any persistent failures that might indicate that a portion of a transiently erring memory is permanently damaged, unusable, or unreliable.

As future generations of memory increases the amount of memory included within a single memory integrated circuit and as dimensional sizes associated with memory cells within a single memory integrated circuit reduce, computers using these memories will encounter an increased number of memory read back errors per unit time: i.e. as memory geometries reduce in size, memory error rates are expected to increase. Increased error rates may be associated with one or more types of events, such as defects in a memory cell, defects in wires connecting memory cells, cosmic rays hitting a memory cell, and radioactive particles impacting memory cells. In certain instances, transient errors may be caused by rise energy from once cell or row of cells leaking to adjacent cells or rows of cells, or they may be caused by cosmic rays or radiation impacting memory cells. This is exacerbated by a continual drive to reduce memory cell size and circuit size.

Some systems currently use error correcting memories that maintain error lists. These error lists store memory error information in small tables that record what DRAM memory locations have experienced an error at some point in time. In certain instances, error correcting memories also have the capability of reporting memory error correction events to a processor or to digital logic. Currently available error correcting memories, however, do not have the ability to distinguish between persistent memory errors versus transient memory errors. This is at least because the error correcting memories are not designed to identify whether an error is transient or persistent. This is also because tabulated data stored to track errors in memories currently do not include information relating the how frequently particular memory cells error. Instead, this currently available tabulated data is used to re-organize the memory such that erring memory locations are avoided. As such, currently available methods commonly re-organize memory to avoid using erring memory locations that are really still good. This is because memory cells that incur a transient error are frequently still functional. What is needed are systems and methods for identifying persistent memory errors as one type of memory error and transient memory errors as a different type of memory error, where only persistent errors cause portions of memory not to be used.

SUMMARY OF THE PRESENTLY CLAIMED INVENTION

The presently claimed invention relates to an apparatus, a method, and a non-transitory computer readable storage medium for classifying errors at a solid state memory. A method of the presently claimed invention identifies errors as they occur when reading data from a solid state memory. When an error occurs, the method stores information that identifies a location in the solid state memory where the error occurred and that identifies a time when the error occurred. When a second or subsequent error occurs at the same location, the stored information relating to the errors is updated to include a timestamp of the second error. The method of the presently claimed invention may then compare the time when the first error occurred with the timestamp of the second error. After comparing these times, the method may identify that the erring location is a persistent error based on a criteria that includes a rule for identifying persistent errors. After the erring location has been identified as a persistently failing location, a function is performed that prevents the erring memory location from being accessed in the future.

When the presently claimed invention is implemented as a non-transitory computer readable storage medium, a processor executing instructions out of the solid state memory or another memory performs a method of classifying errors. Here again the presently claimed invention identifies when an error occurs in the solid state memory. When an error occurs, the method stores information that identifies a location in the solid state memory where the error occurred and that identifies a time when the error occurred. When another error occurs at the same location at a later time, the stored information relating to the errors is updated to include a timestamp of the second error. The method of the presently claimed invention may then compare the time when the first error occurred with the timestamp of the second error. After comparing the times when the first and the second error occurred, the method identifies that the erring location is a persistent error based on a criteria that includes a rule for identifying persistent errors. After the erring location has been identified as a persistently failing location, a function is performed that prevents the erring memory location from being accessed in the future.

An apparatus consistent with the presently claimed invention includes solid state memory integrated circuits coupled to a memory controller. The memory controller may include a processor, a field programmable gate arrays (FPGA), an application specific integrated circuits (ASIC), or digital logic. The memory controller then performs the method of the presently claimed invention. Here again the presently claimed invention identifies when an error occurs in the solid state memory. When an error occurs, the method stores information that identifies a location in the solid state memory where the error occurred and that identifies a time when the error occurred. When another error occurs at the same location at a later time, the stored information relating to the errors is updated to include a timestamp of the second error. The method of the presently claimed invention may then compare the time when the first error occurred with the timestamp of the second error. After comparing the times when the first and the second error occurred, the method identifies that the erring location is a persistent error based on a criteria that includes a rule for identifying persistent errors. After the erring location has been identified as a persistently failing location, a function is performed that prevents the erring memory location from being accessed in the future.

DETAILED DESCRIPTION

Figure 1:
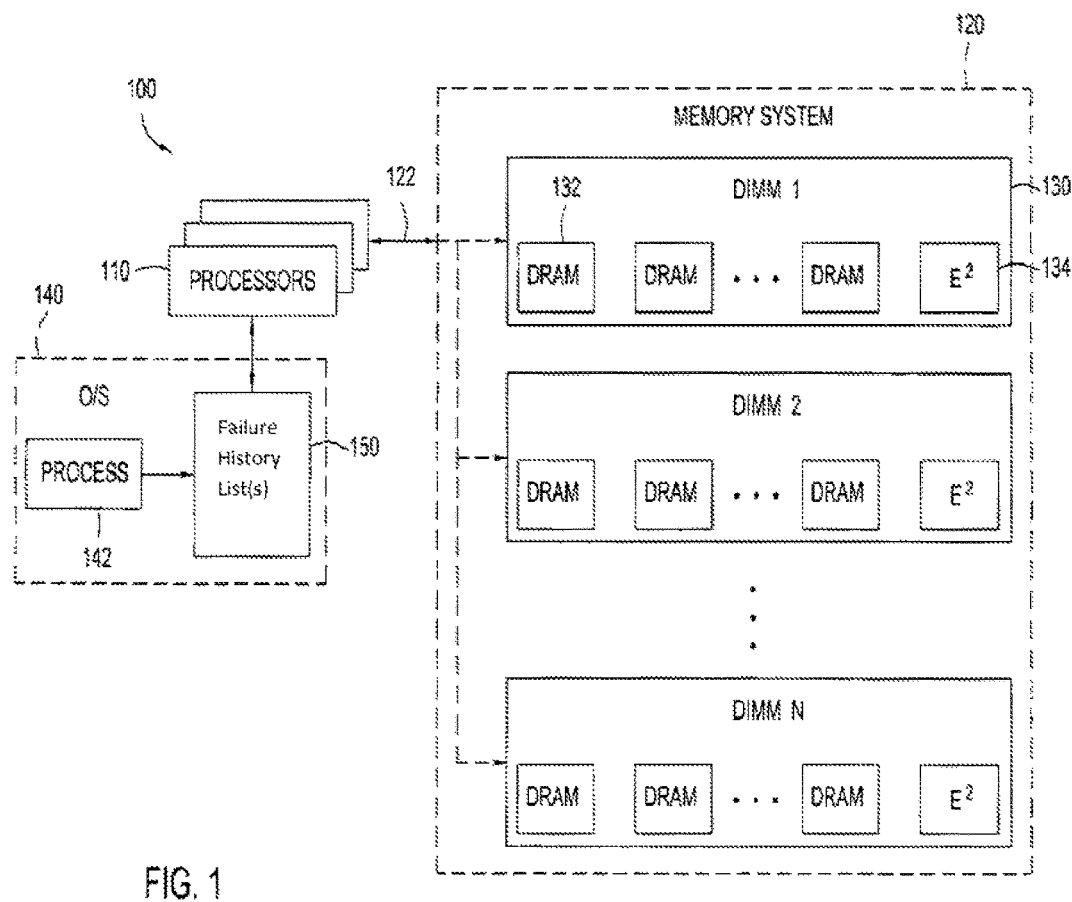
FIG. 1 illustrates a plurality of memories of a memory system that are coupled to one or more processors.

The present disclosure relates to an apparatus and a method for collecting failure history lists to identify and categorize defective memory locations in dual inline memory modules (DIMMs), for example. Those skilled in the art will recognize that embodiments of the present disclosure may also be used to identify and categorize defective memory locations in any other type of memory module, memory package, multi-chip module, or arrangement of memory devices, including cache memory structures. Thus, reference to DIMMs should be understood as a particular, but not limiting, example of a type of memory module.

Further, while embodiments will be described with reference to operations performed by executing code (e.g., by a processor or CPU), it may also be possible to perform similar operations with dedicated or modified hardware including yet not limited to application specific integrated circuits (ASICs), field programmable gate arrays (FPGAs), and other forms of digital logic. Further, those skilled in the art will recognize that the techniques described herein may be used to advantage in any type of system in which multiple memory devices are utilized. In fact, error detection and correction may be performed faster in hardware that they can typically be detected and corrected by a processor executing instructions out of a memory.

In one aspect of the present invention a failure history list is constructed based on information received after a memory error has been identified. After a memory error has been identified and corrected, history information may be used to identify transient versus persistent memory errors. In one example, error event data may include, without limitation, a DIMM location, a DRAM within the DIMM, failing bits within the DRAM, the failing bank number, row number and column number within the DRAM, a time and date (timestamp) of the current and/or previous similar failures, a System Memory address, and an error/failure count. All of this information may be collected by a software application executed such as Memlog, available through Silicon Graphics International, Corp, by a memory controller, or by a memory module.

When memory error information is collected by a software application executed by a processor, the processor may receive error information from the memory or from a memory module. In certain instances, embodiments of the present disclosure may be implemented within a memory module or be coupled to a memory module. In certain instances, methods of the present disclosure may be implemented both by a processor and/or by other apparatus that monitors and characterizes memory errors. As such, a memory module or memory module monitor could report persistent memory erring locations to a processor and the processor could then avoid using those locations. Such a processor could also interact with a software application such as Memlog when organizing memory error reports that could be provided to a user or to the software of an operation system.

By increasing the amount of error information collected, a map or list of failures (failure history list) may be created or appended to. Each new memory error correction event may add new detailed information to this list. Such a list may be, for example, constructed in a manner similar to the table construction of information based on the error correcting memory reports of corrected error events, for example, as disclosed in U.S. Pat. No. 7,478,284 (incorporated by reference into this specification). The lists constructed in accordance with the present invention, however, are of a different format, include more information, and record different types of data that may be organized differently than previously disclosed.

In accordance with the present invention, the evaluation of the operational state of a DIMM or DRAM or other type of storage may be identified by analysing the relative times and locations (e.g. bit, row, column, bank) of reported failures in the monitored memories. By applying appropriate criteria an error category or type may be identified, in particular. For example, transient memory failures may be distinguished from persistent memory failures.

In a transient failure mode, a DRAM may experience a short burst of memory errors contained in a few bits, rows and/or columns, but this burst may never re-occur. Other bits, rows and/or columns in other time periods (hours or days apart) may also experience error bursts. In a persistent failure mode the DRAM might have a portion of memory that is permanently damaged, unusable and/or unreliable. By identifying a failure of one or more bits, rows, columns and/or a data-path out of a memory array to be a persistent failure, an analysis in accordance with the present invention can assess whether a DRAM might be experiencing a general failure and require replacement. As such, apparatus and methods consistent with the present disclosure can reduce false identification of predictive failure events that could lead to unnecessary DIMM replacement. Such false predictions could also lead to a slowing of a computer system due to too many memory locations not being utilized (i.e. mapped out), or may cause other effects. While a row hammer episode is one commonly known example of burst errors, errors may also be generated when cosmic ray, radiation, electrical/electrical magnetic transients may also cause burst errors in memory cells.

FIG. 1 illustrates a plurality of memories of a memory system that are coupled to one or more processors. FIG. 1 illustrates an exemplary computing system 100 including one or more processors 110 coupled to a memory system 120 via an interface 122. While not shown, the system 100 may also include any other suitable components, such as graphics processor units (GPUs), network interface modules, or any other type of input/output (I/O) interface. The interface 122 may include any suitable type of bus (e.g., a front side bus) and corresponding components to allow the processors 110 to communicate with the memory system 120 and with each other.

As illustrated in FIG. 1, the memory system 120 may include a plurality of memory modules, illustratively shown as DIMMs 130. As previously described, the number of DIMMs 130 may grow quite large, for example, into the thousands for large scale memory systems of several terabytes (TBs). Each DIMM 130 may include a plurality of volatile memory devices, illustratively shown as dynamic random access memory (DRAM) devices 132. As previously described, as the number of DIMMs 130 increases, thereby increasing the number of DRAM devices 132, the likelihood of a defect developing in a memory location over time increases.

In an effort to monitor the defective memory locations, one or more failure history lists 150 may be maintained to store memory failure locations and types. Contents of the defect tables 150 may be maintained across reset cycles, for example, by storing the defect tables 150 in non-volatile memory. As will be described in greater detail below, for some embodiments, defect tables 150 may be stored on the DIMMs or in a non-volatile memory connected to the DIMMs, such as EEPROMs 134 (or FLASH memory), allowing defect information to travel with the DIMMs.

Defects may be detected via any suitable means, including conventional error checking algorithms utilizing checksums, error correction codes (ECC) bits, and the like. Regardless, upon detection of a memory failure or error, an entry may be made in the history list 150 and the failed memory location may or may not be remapped to a different (non-defective) location. In some cases, system level software, such as a process 142 running as part of an operating system (O/S) 140 may detect memory failures, maintain, and/or utilize the history list 150, by performing operations described herein. In certain instances, a single history list 150 may be used to store defective locations for multiple DIMMs 130. In other instances, a different history list 150 may be maintained for each DIMM 130.

For some instances, a predetermined amount of memory locations (i.e. spare memory locations) in the DIMM may be allocated and used to replace defective memory locations when detected. In some cases, replacement may be allowed in specified minimal sizes. For example, a DIMM may be replaced after all spare memory locations at the DIMM have been allocated for use. As such, history list 150 may track the number of allocated spare memory locations are used or that are available for future use.

Figure 2:
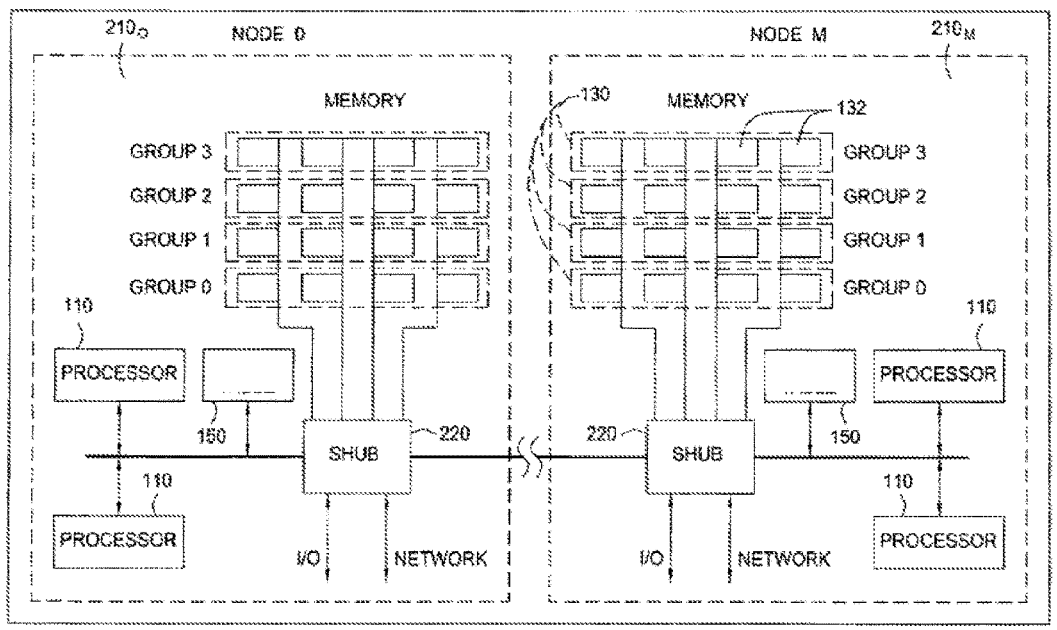
FIG. 2 illustrates an exemplary apparatus that may implement methods consistent with the present disclosure.

FIG. 2 illustrates an exemplary apparatus that may implement methods consistent with the present disclosure. FIG. 2 includes a plurality of nodes 210 (as shown 210 0-210 M), where each node includes one or more processors 110, DIMMs 130, and an interface hub (SHUB) 220.

The collective memory of each node 210 0-210 M may be considered shared memory and accessible by processors 110 on each node. As illustrated, in such configurations, each node 210 0-210 M may maintain one or more history lists 150 to store information regarding defective memory locations for their respective DIMMs 130. In certain instances, Failure History Lists may be created such that a failure of a particular bank and row of a DIMM causes a linked failure history list to be formed for the failed bank and row. In such an instance, the linked failure history list may be ordered in a linked list. When a linked like is used, an entry identifying a most recent failure/error may be placed at the top (a first entry) of or at the bottom (a last entry) of the linked list. Each entry of such a linked list may identify or be associated with a specific column of a bank and row (e.g. a specific bit) in a memory.

Failures for the same row but a different column in the row of a DRAM may be placed at the end of a list and older entries may be pushed down the list. Subsequent failures for a column that already exists in the list pulls that entry to top of list, and increments the failure count for that bit (row and column). The list entry may also include timestamps for a first failure and a most recent failure of a bit in a particular memory.

TABLE 1

Memory Failure/Error List

| rank | dram | sort | bank | row | col | latest | earliest | dq | hits | severity |
|---|---|---|---|---|---|---|---|---|---|---|
| Rank 1 | Dram 6 | rowsort | 0 | 36016 | 648 | 1444497292 | 1444407590 | 2 | 8 | 2 |
| Rank 1 | Dram 6 | rowsort | 0 | 36016 | 120 | 1444456304 | 1444456114 | 2 | 2 | 0 |
| Rank 1 | Dram 6 | rowsort | 0 | 36016 | 216 | 1444484586 | 1444484024 | 2 | 4 | 0 |

Table 1 illustrates memory error (failure) information that may be stored in a table or list of memory errors/failures. Note that three entries (rows) appear in table 1. Each entry in Table 1 identifies a rank, a DRAM number, error location information (a bank, a row and a column-col), a latest timestamp (that identifies a time of a most recent error at a location), and a timestamp of a first occurrence of an error at the erring location. Table 1 also includes a "dq" entry (i.e. a bit entry), and number of "hits" (erring incidents). The "dq" bit entry in table 1 may identify how many bits at an identified location have been in an erring state. The number of hits relates to a number of errors that have occurred when reading data from a particular bit between an earliest and a latest time. The "severity" column of Table 1 indicates whether an erring location is considered to be a transient (severity=0) error or a persistent (severity=2) error. Note that each entry in table 1 identifies that bank 0 and row 36016 of DRAM 6 are associated with errors, where column 648 in DRAM 6 is considered to be a severe error because its severity level is 2. In certain instances, a number of hits may be associated with a severity level. For example, a number of hits reaching a threshold level of 8 may cause a severity level to be set at 2 (persistent), and that a number of hits equal to 6 may cause the erring level to be set to 1 (transient). Note also the columns 120 and 216 in DRAM 6, bank 0, row 36016 have a number of hits equal to 2 and 4 respectively.

The severity level of a particular erring location may be set based on a set of criteria or rules. For example, when a difference (delta) between in time between a latest error timestamp and an earliest error timestamp for a particular erring location is used to identify persistent erring locations is greater than a predetermined or dynamically set (threshold) period of time, that erring location may be classified as being persistent. If this criteria were applied to the entry in the first row of table 1, the latest erring time minus the earliest erring time would equal (144497292)–(144456114) =41178 units of time. In the instance where a severe erring delta time threshold was set at 40000 units of time, the erring location at bank 0, row 36016, column 648 would be classified as persistent (severity level 2) because 41178 is greater than 40000. Units of time may be of any time including, yet not limited to milliseconds or microseconds.

In yet another example, a total number of errors associated with a particular DRAM or DRAM bank may be tracked. In such an instance, a number of hits (errors) associated with a particular DRAM or DRAM bank may be tracked independently of the particular row or columns that were associated with the errors. In such an instance, a high error rate associated with a particular DRAM bank may indicate that a particular DRAM bank has a high error rate. A DRAM bank may correspond to one or to a plurality of individual memory cells, where each memory cell stores at least a bit of data.

are detected. Information relating to those detected errors are then stored in step 320. After the erring information is stored in step 320, information relating to error times and locations are analyzed in step 330 of FIG. 3. The analysis performed in step 330 may identify whether the errors stored in step 320 should be classified as transient errors or as persistent errors.

As mentioned above, different sets of criteria may be applied to memory failure/error history lists when detecting different types or classes of failures/errors associated with a DRAM or DIMM. For example, in one embodiment, "aging" may be used to remove entries from the list. When the list is examined, the "oldest" entries are examined and if a particular entry's most recent hit time or date is older than a certain age, the entry is removed. This age may be on the order of minutes, hours, days, weeks or a longer period and may be manually or automatically and dynamically adjustable. Transient errors may be dismissed by being removed from the failure log after a given period of time. If the only entry in a list is aged out as described above, the list itself may be removed or deleted.

In another embodiment, an age criteria may be configured to correlate to a background cleaning or "memory scrub" operation. Such an operation may be used to re-write an erring location in a DRAM with data that has been corrected by an error correction code (ECC) algorithm after an error has been detected. Such a location could be removed from the memory failure/error list after corrected data has been re-written to the previously erring location. Depending on a particular implementation, such a "memory scrub" operation may be performed only on memory cells associated with transitory errors. Such "memory scrub" operations may include steps where a previously erring location is tested by writing and reading other data to that memory location before the ECC corrected data is written back to that location.

Figure 4:
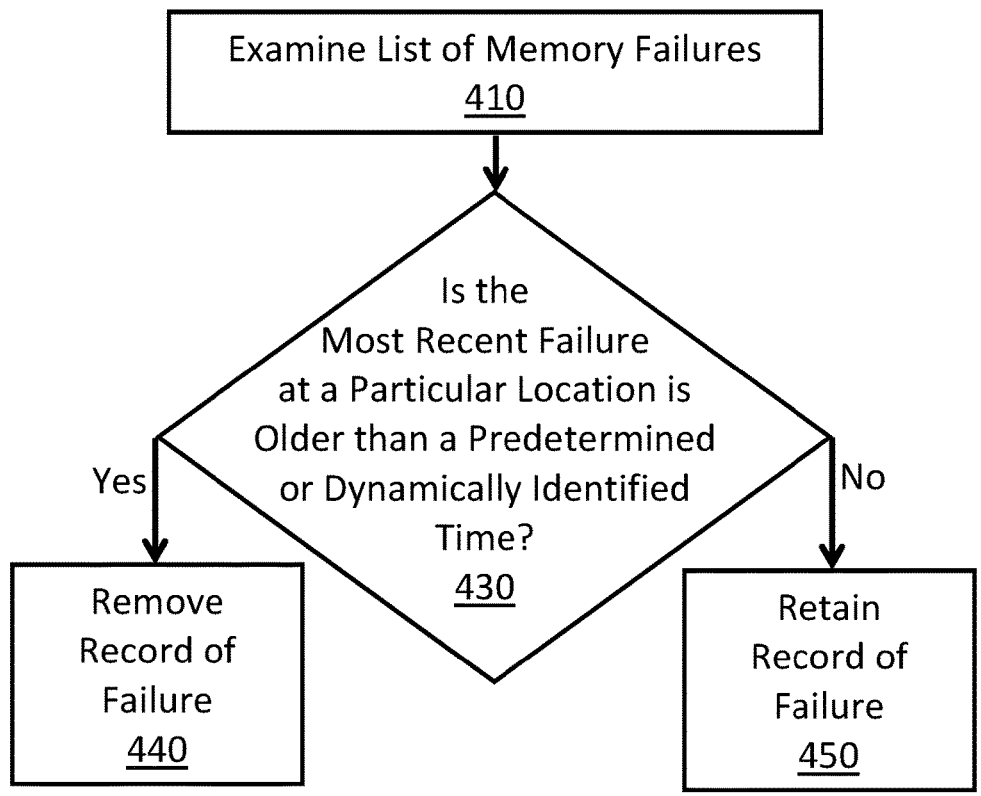
FIG. 4 shows a second exemplary method consistent with the present disclosure where entries in a failure/error list may be removed after they have reached a certain age.

FIG. 4 shows a second exemplary method consistent with the present disclosure where entries in a failure/error list may be removed after they have reached a certain age. Step

TABLE 2

Another Memory Failure/Error List

| rank | dram | sort | bank | row | col | latest | earliest | dq | hits | severity |
|---|---|---|---|---|---|---|---|---|---|---|
| Rank 1 | Dram 6 | rowsort | 0 | 36016 | 648 | 1444497292 | 1444407590 | 2 | 8 | 2 |
| Rank 1 | Dram 6 | rowsort | 0 | 36016 | 120 | 1444456304 | 1444456114 | 2 | 2 | 0 |
| Rank 1 | Dram 6 | rowsort | 0 | 36016 | 216 | 1444484586 | 1444484024 | 2 | 4 | 0 |
| Rank 1 | Dram 6 | rowsort | 2 | 36024 | 904 | 1444484123 | 1444462854 | 2 | 3 | 0 |
| Rank 1 | Dram 6 | rowsort | 5 | 36024 | 776 | 1444482231 | 1444482222 | 2 | 4 | 0 |
| Rank 1 | Dram 6 | rowsort | 12 | 36024 | 696 | 1444456304 | 1444456304 | 2 | 2 | 0 |

Table 2 illustrates another exemplary memory failure/error list tracking errors in a set of DRAMS. Note that the top three entries in table 2 are the same entries as those included in table 1. Note also the last three entries in table 2 identify that row 36024 has had errors in banks 2, 5, and 12.

Other statistics that may be tracked in a memory failure/error list include: a number of different columns having errors in a particular DRAM, a number of errors for a given row of a DRAM, and/or a number of errors for a given column of a DRAM.

Figure 3:
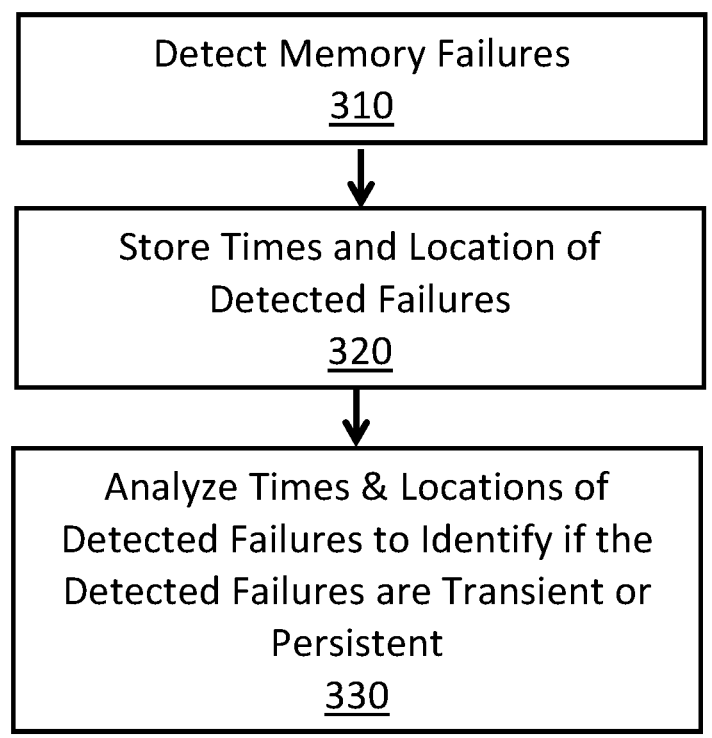
FIG. 3 illustrates an exemplary method consistent with the present disclosure for identifying whether errors at particular locations of a memory are transient or persistent.

FIG. 3 illustrates an exemplary method consistent with the present disclosure for identifying whether errors at particular locations of a memory are transient or persistent. FIG. 3 begins with step 310 where memory failures/errors 410 of FIG. 4 is a step where errors in a list of failures/errors are examined. Next, determination step 430 identifies whether a most recent failure/error associated with a particular location is older than a predetermined or dynamically identified time, when no, program flow moves to step 440 where the entry related to that particular location is retained in failure/error list. When the most recent error associated with the particular location is older than the predetermined or dynamically identified time, the entry relating to that particular erring location may be removed from the failure/error list in step 440 of FIG. 4.

Note that table 3 includes all of the entries that are included in table 2 except for one. The one entry not included in table 3 as compared to table 2 is the entry that identified bank 0, row 36016, and column 120 as being an erring location in DRAM 6. This entry may have been removed from the failure/error list because that entry has "aged out" (i.e. has not experienced an error for a predetermined amount of time according the method of FIG. 4).

TABLE 3

Memory Failure/Error List After an Entry has "Aged Out"

| rank | dram | sort | bank | row | col | latest | earliest | dq | hits | severity |
|---|---|---|---|---|---|---|---|---|---|---|
| Rank 1 | Dram 6 | rowsort | 0 | 36016 | 648 | 1444497292 | 1444407590 | 2 | 8 | 2 |
| Rank 1 | Dram 6 | rowsort | 0 | 36016 | 216 | 1444484586 | 1444484024 | 2 | 4 | 0 |
| Rank 1 | Dram 6 | rowsort | 2 | 36024 | 904 | 1444484123 | 1444462854 | 2 | 3 | 0 |
| Rank 1 | Dram 6 | rowsort | 5 | 36024 | 776 | 1444482231 | 1444482222 | 2 | 4 | 0 |
| Rank 1 | Dram 6 | rowsort | 12 | 36024 | 696 | 1444456304 | 1444456304 | 2 | 2 | 0 |

As mentioned above the present disclosure is related to identifying whether an erring location represents a persistent versus transient failure or error. Such errors may be associated with a bit, a row, and/or a column of a particular DRAM in a particular DIMM. Additionally, methods consistent with the present disclosure may identify that a persistent failure is related to a particular data path of a memory array. For example, a persistent failure may associated with a particular bit that spans a particular row or column. Such a defect may be a defect associated with a wire in a DRAM (i.e. a "wire-fail"). For example, when a wire in a DRAM that addresses or connects to a particular row of the DRAM is an electrical open circuit, that DRAM address or connection may never address or connect to a memory cell that was intended to be accessed. Other exemplary wire-fail defect type that may be associated with a DRAM wire-fail include an electrical short circuit between wires or features within a DRAM.

In instances where a number of errors of a single bit that have not been "aged out" exceeds a pre-set or dynamically set number "N," that single bit may be classified as a persistent bit error. Additionally, if a number of errors relating to a number columns in a given row that have not been "aged out" exceeds a pre-set or dynamically set number "M," an entire row in the memory may be classified as being a persistently erring row. The process of identifying a persistently erring row may include identifying a number of columns associated with that row that have previously had errors, when a number of columns associated with that row have in totality have a number of errors equal to or greater than a threshold number, the row may be classified as being a persistently erring row. After a row has been identified as a persistently erring row, the entire row may be mapped out and not used. In certain instances, entire columns associated with persistent erring locations may be classified as persistently erring columns.

Figure 5:
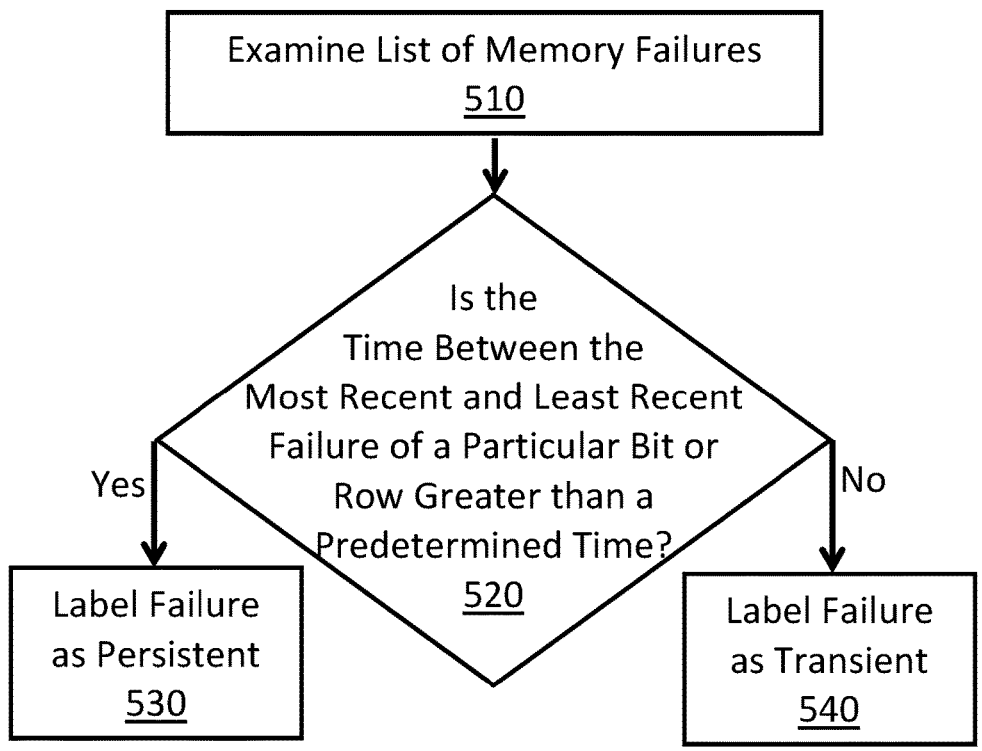
FIG. 5 illustrates an exemplary method that may be performed when identifying whether a bit or a row in a memory is persistently erring.

FIG. 5 illustrates an exemplary method that may be performed when identifying whether a bit or a row in a memory is persistently erring. In step 510 a failure/error list may be examined. Determination step may then identify whether a time between a most recent error and a least recent error is greater than a predetermined amount of time. When the time between the most and the least recent error is greater than the predetermined amount of time, a bit or row associated with those errors may be labeled as persistent. In the instance where the time between the most and the least recent error is less than the predetermined amount of time, then a bit or row associated with those errors may be labeled as transient.

A wire-fail for a DRAM or DIMM may be identified when at least one failure is recorded for the same bit location across a predetermined percentage of multiple memory cells/banks. For example, after a threshold percentage of memories associated with a particular row or column have errored, a determination may be made that identifies that memory cells associated with an entire row or column should not be used. Depending on a threshold setting, rows or columns may be mapped out when as little as 20% of the memory cells are associated with a persistent error, or when 70% or more cells are associated with transient errors. For example, a few persistent errors associated with a row may provide sufficient reason to map out a row, and a large number of temporary errors associated with a column may provide sufficient reason to map out a column. In such instances, failures associated with a percentage of memories cells or banks may or may not also remove a row or a column associated errors using the predetermined aging methods described previously.

Figure 6:
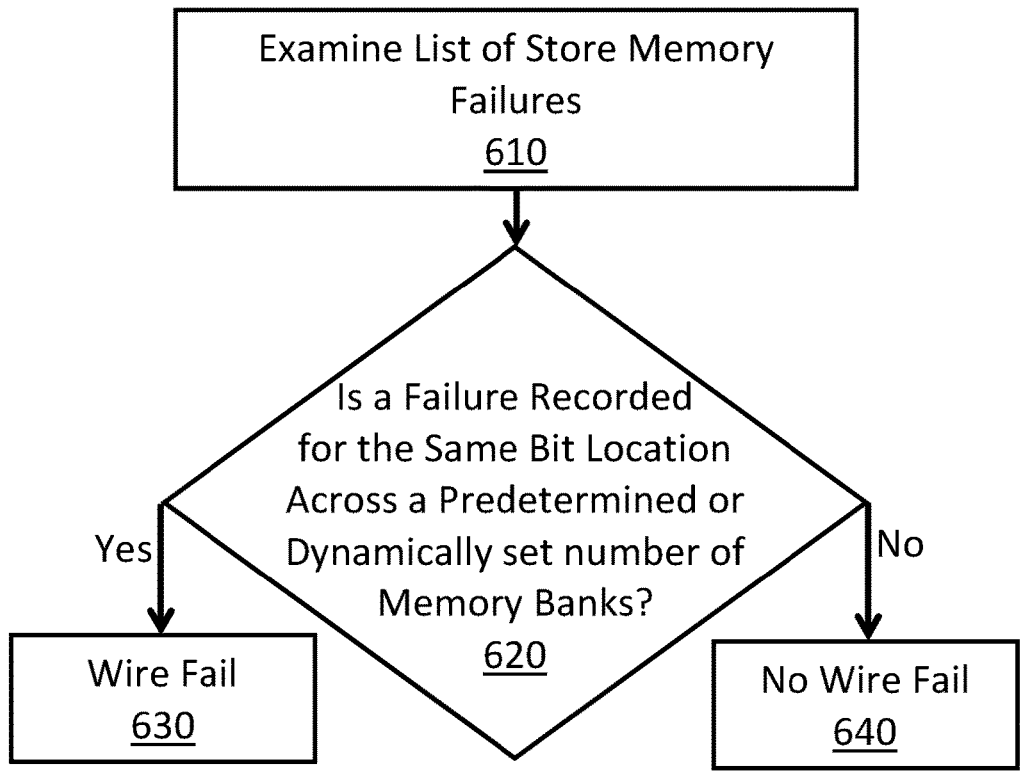
FIG. 6 illustrates an exemplary embodiment of a method according to the present disclosure for detecting a wire-fail in a memory.

FIG. 6 illustrates an exemplary embodiment of a method according to the present disclosure for detecting a wire-fail in a memory, such as a DRAM or DIMM. Step 610 is a step where a failure/error list is examined for memory errors. Next determination step 620 may then identify whether errors are associated with a same bit location across a predetermined or dynamically set number of memory blocks, when yes, program flow moves to step 630 where a wire-fail is identified. When determination step 620 identifies that errors are not associated with the same bit location across the predetermined or dynamically set number of memory blocks, program flow moves from step 620 to step 640 where the error is not identified as being associated with a wire-fail. After the error is identified as being associated with a wire-fail in step 630, a program application executing on a processor may map out memory cells associated with the wire-fail. Here again an entire row or column (or portion of a row/column) may be mapped out after wire-fail is identified in step 640. The mapping out may be performed by a processor executing a program application or may be mapped out by a controller implemented in an FPGA, ASIC, a micro-processor executing firmware, by logic, or combination thereof.

In certain circumstances, an erring memory cell in a DRAM may appear to be erring persistently when the memory cell is really good. This may occur, for example, when an application running on the system accesses a row in memory repeatedly over a short period of time. Errors of this nature are referred to as "overuse" errors. Overuse errors are errors that occur when a memory is used frequently and that disappear after the memory cell or a row of memory has not been used for a period of time.

To filter overuse errors from being reported as persistent errors, the timestamps on the failure/error entries may be checked. When a first recorded error of a given bit or in a given row is within a predetermined time from the most recent error for that bit or row, then a persistent error may not be indicated. As such, entries in a failure/error log related to an overuse error may be deleted. Alternatively, a suspected overuse error may be tested after period of inactivity to identify whether the suspected overuse errors are really transitory. In instances where such an overuse test identifies that the suspected overuse error was a transitory error, information relating to the overuse error may be deleted from the failure/error log. In instances where the overuse test results in more errors, the suspected overuse erring memory cell may be classified as a persistent error.

The examples discussed above of criteria based on location and timing of memory errors that are used to distinguish persistent versus transient errors are not meant to be limiting. The present invention may encompass any use of data indicating location and timing of memory errors when identifying whether a memory cell has persistently or transiently failed.

As a system and method in accordance with the present invention collects failure data, that failure data may be reported to a user. Such reports can include a number of different types of information about the reported failures. For example, failure data reported may include, without limitation, a timestamp, an error type (e.g. correctable/uncorrectable), a bit, a row, a column, a wire-fail error status, a DRAM number, a DIMM identifier, and an indication identifying whether a memory location is associated with a persistent or a transient erring location). As such, this information may be used to identify a DIMM, a DRAM, or other identification information regarding memory errors. In certain instances, the location and/or geometry (e.g. bit, row, column, bank, wire) of the failure as well as other relevant information may be provided to a user, to a controller, or to a software application program.

An exemplary failure report is shown below, this example includes an includes Error type (Read ECC), DIMM location (P2 DIMM H21), DRAM geometry (Rank 1 Bank 3, row 0x927, column 0x3d0), DRAM & bit identification (DRAM U0B DQ2), Temperature (49 degrees C.), and a failure type of persistent.

may be implemented with a magnetic disk drive, solid state drives, an optical disk drive or other devices, may be a non-volatile storage device for storing data and instructions for use by processor unit 710. Mass storage device 730 can store the system software for implementing embodiments of the present invention for purposes of loading that software into main memory 720.

Portable storage device 740 operates in conjunction with a portable non-volatile storage medium, such as a FLASH thumb drive, compact disk or Digital video disc, to input and output data and code to and from the computer system 700 of FIG. 4. The system software for implementing embodiments of the present invention may be stored on such a portable medium and input to the computer system 700 via the portable storage device 740.

Figure 7:
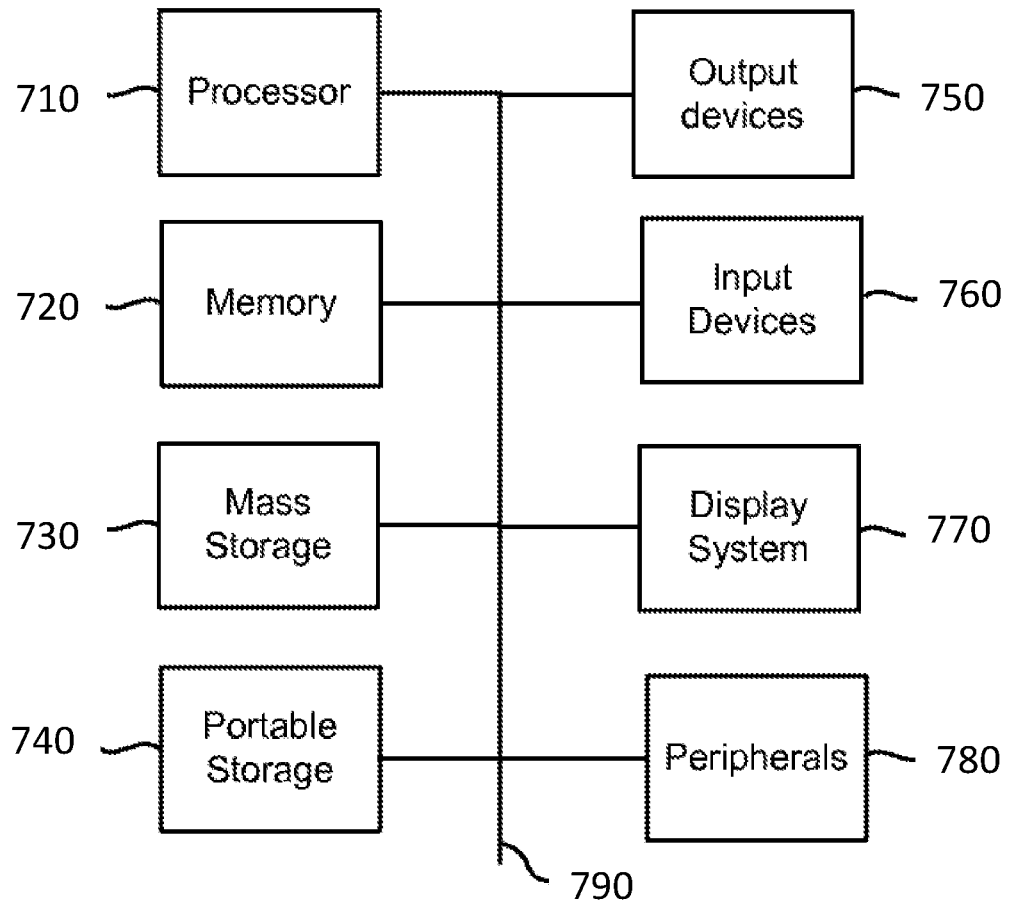
FIG. 7 illustrates an exemplary computing system that may be used to implement all or a portion of a device for use with the present technology.

Input devices 760 provide a portion of a user interface. Input devices 760 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD) or other suitable display device. Display system 770 receives textual and graphical information, and processes the information for output to the display device.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, hand held computing device, telephone, mobile

```
Error Reporting              Error type  DIMM location  DRAM geometry
Jun 5 08:36:24 r2i0n6 MEMLOG[11668]: Read ECC  P2_DIMMH1     Rank 1 Bank
3 Row 0xb927 Col 0x3d0 DRAM U0B DQ2 Temp = 49 C.  persistent DRAM geometry      DRAM & bit   Temperature  Failure type
```

FIG. 7 illustrates an exemplary computing system that may be used to implement all or a portion of a device for use with the present technology. The computing system 700 of FIG. 7 includes one or more processors 710 and memory 720. Main memory 720 stores, in part, instructions and data for execution by processor 710.

Main memory 720 can store the executable code when in operation. The system 700 of FIG. 4 further includes a mass storage device 730, portable storage medium drive(s) 740, output devices 750, user input devices 760, a graphics display 770, and peripheral devices 780. The components shown in FIG. 7 are depicted as being connected via a single bus 790. However, the components may be connected through one or more data transport means. For example, processor unit 710 and main memory 720 may be connected via a local microprocessor bus, and the mass storage device 430, peripheral device(s) 780, portable storage device 740, and display system 770 may be connected via one or more input/output (I/O) buses. Mass storage device 730, which computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Android, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method comprising:
   identifying that a first error has occurred when reading a memory cell of a solid state memory a first time;
   storing information relating to the first error in an error repository, wherein the information stored includes at least information that identifies a location where the first error occurred and includes a first timestamp that identifies a time when the first error occurred;
   identifying that a second error has occurred when reading the memory cell a second time;
   updating the stored information relating to the first error to include information relating to the second error, wherein the information relating to the second error includes a second timestamp that identifies when the second error occurred;
   in response to a difference between the first timestamp and the second timestamp being greater than a threshold, identifying that the location is experiencing a persistent error, and preventing the location from being subsequently accessed and
   in response to the difference being less than the threshold, identifying that the location is experiencing a transient error, and permitting the location of the transient error to be subsequently accessed.

2. The method of claim 1, wherein the solid state memory resides on a module that includes a plurality of individual memory integrated circuits.

3. The method of claim 1, wherein the module is a dual in-line memory module (DIMM).

4. The method of claim 1, wherein the function performed includes providing identifying information that identifies the location of the persistent error.

5. The method of claim 4, wherein a processor executing an application program out of the solid memory or another memory prevents the location of the persistent error from being accessed after the identifying information has been provided to the processor executing the application program.

6. The method of claim 2, wherein a memory controller in communication with the memory module accesses a different memory location other than the location of the persistent error when preventing the location of the persistent error from being accessed.

7. The method of claim 1, wherein the stored information also includes a bank number, a number of hits, and a severity rating.

8. The method of claim 1, wherein:
   the location of the persistent error corresponds to at least one of a bit, a row, and a column of the solid state memory;
   the method further comprises preventing a plurality of additional locations from being accessed upon identifying the location experiencing the persistent error, the plurality of additional locations corresponding to the at least one bit, the row, and the column of the solid state memory.

9. A non-transitory computer readable storage medium having embodied thereon a program executable by a processor to perform a method comprising:
   identifying that a first error has occurred when reading a memory cell of a solid state memory a first time;
   storing information relating to the first error in an error repository, wherein the information stored includes at least information that identifies a location where the first error occurred and includes a first timestamp that identifies a time when the first error occurred;
   identifying that a second error has occurred when reading the memory cell a second time;
   updating the stored information relating to the first error to include information relating to the second error, wherein the information relating to the second error includes a second timestamp that identifies when the second error occurred;
   in response to a difference between the first timestamp and the second timestamp being greater than a threshold, identifying that the location is experiencing a persistent error, and preventing the location from being subsequently accessed; and
   in response to the difference being less than the threshold, identifying that the location is experiencing a transient error, and permitting the location to be subsequently accessed.

10. The non-transitory computer readable storage medium of claim 9, wherein the solid state memory resides on a module that includes a plurality of individual memory integrated circuits.

11. The non-transitory computer readable storage medium of claim 9, wherein the module is a dual in-line memory module (DIMM).

12. The non-transitory computer readable storage medium of claim 9, wherein the method further comprises providing identifying information that identifies the location of the persistent error.

13. The non-transitory computer readable storage medium of claim 12, wherein the processor prevents the location of the persistent error from being accessed after the identifying information has been received by the processor.

14. The non-transitory computer readable storage medium of claim 10, wherein the processor accesses a different memory location other than the location of the persistent error when preventing the location of the persistent error from being accessed.

15. The non-transitory computer readable storage medium of claim 9, wherein the criteria for identifying that the location where the first error occurred includes identifying that a threshold number of errors have occurred when reading the location where the first error occurred.

16. The non-transitory computer readable storage medium of claim 9, wherein the criteria for identifying that the location where the first error occurred includes identifying that one or more other errors include at least one of the same bank, the same row, and the same column of the memory.

17. An apparatus comprising:
   one or more solid state memory integrated circuits;
   and a memory controller, the memory controller including at least one of a processor, a field programmable gate array (FPGA), an application specific integrated circuit (ASIC), or digital logic, wherein the memory controller:
      identifies that a first error has occurred when reading a memory cell a first time;
      stores information relating to the first error in an error repository, wherein the information stored includes at least information that identifies a location where the first error occurred and includes a first timestamp that identifies a time when the first error occurred;
      identifies that a second error has occurred when reading the memory cell a second time;
      updates the stored information relating to the first error to include information relating to the second error, wherein the information relating to the second error includes a second timestamp that identifies when the second error occurred;

in response to a difference between the first timestamp and the second timestamp being greater than a threshold, identify that the location is experiencing a persistent error, and prevent the location from being subsequently accessed; and in response to the difference being less than the threshold, identify that the location is experiencing a transient error, and permit the location to be subsequently accessed.

18. The apparatus of claim 17, wherein:

the location of the persistent error corresponds to at least one of a bit, a row, and a column of the solid state memory;

wherein the memory controller also prevents a plurality of additional locations from being accessed upon identifying that the location is experiencing the persistent error, the plurality of additional locations corresponding to the at least one bit, the row, and the column of the solid state memory.

19. The method of claim 1, wherein by permitting the location to be subsequently accessed when responsive to identifying the transient error and preventing the location from being subsequently accessed responsive to identifying the persistent error, the method reduces false predictive failure event identification.

20. The method of claim 19, wherein by reducing the false predicting failure event identification, the method reduces unnecessary replacement of the solid state memory.

* * * * *